United States Patent [19]
Kowalik

[11] 3,741,331
[45] June 26, 1973

[54] CLOSE COUPLED FRAME STEERED ALL CRAWLER TRACTOR

[75] Inventor: John J. Kowalik, Glenview, Ill.

[73] Assignee: International Harvester Company, Chicago, Ill.

[22] Filed: Aug. 21, 1970

[21] Appl. No.: 65,826

[52] U.S. Cl. .............................................. 180/9.44
[51] Int. Cl. ...................... B62d 11/20, B62d 55/30
[58] Field of Search ..................... 180/9.44, 9.46; 305/10

[56] References Cited
UNITED STATES PATENTS

| 3,451,494 | 6/1969 | Kowalik | 180/9.44 X |
| 3,332,725 | 7/1967 | Reinsma | 305/10 |
| 3,435,908 | 4/1969 | Sunderlin | 180/9.44 |

FOREIGN PATENTS OR APPLICATIONS

| 65,826 | 10/1935 | Germany | 180/9.46 |
| 1,401,309 | 4/1965 | France | 305/10 |

Primary Examiner—Richard J. Johnson
Attorney—Floyd B. Harman

[57] ABSTRACT

Frame-steered, all crawler tractor having articulated frame sections end-to-end, and crawler tracks provided on one section which can be retracted from those confronting crawler tracks in tandem therewith which are provided on the other section. In driving the tractor into a turn I thus afford a retractive endless track, say a rear track which, as I make the turn, takes the inside of the turn, but at all times keeps its distance from the front track at the inside of the turn.

There is no interference because the retractive track, in the case of the rear track for instance, does not try to climb up on the front track, and the resulting close-coupled articulated vehicle is not train-like in length.

2 Claims, 7 Drawing Figures

PATENTED JUN 26 1973

Inventor:
John J. Kowalik
By John W. Gaines
Atty.

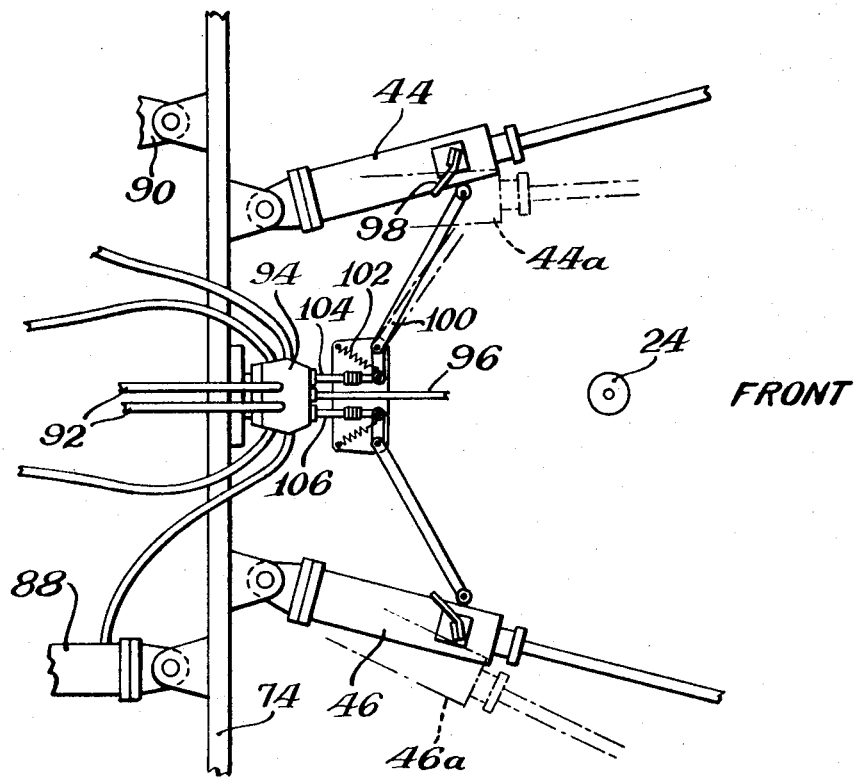
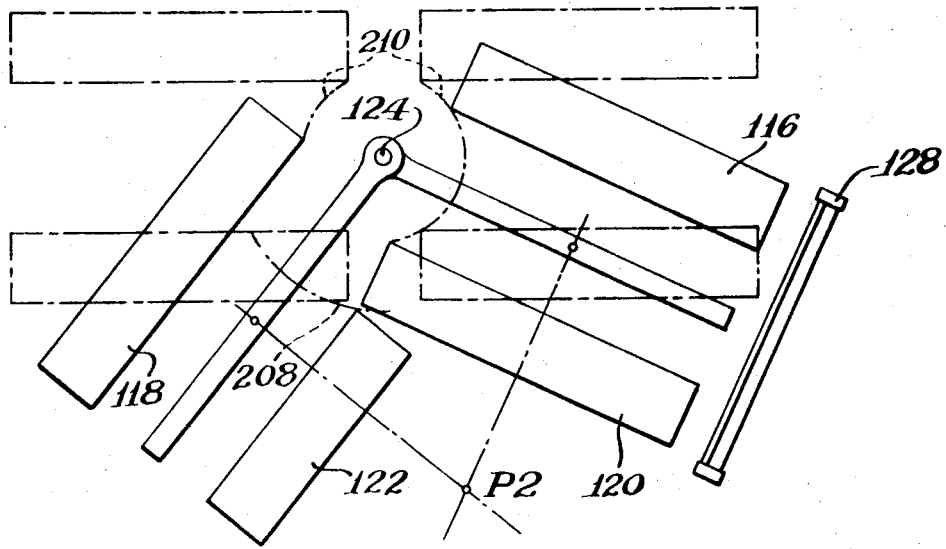

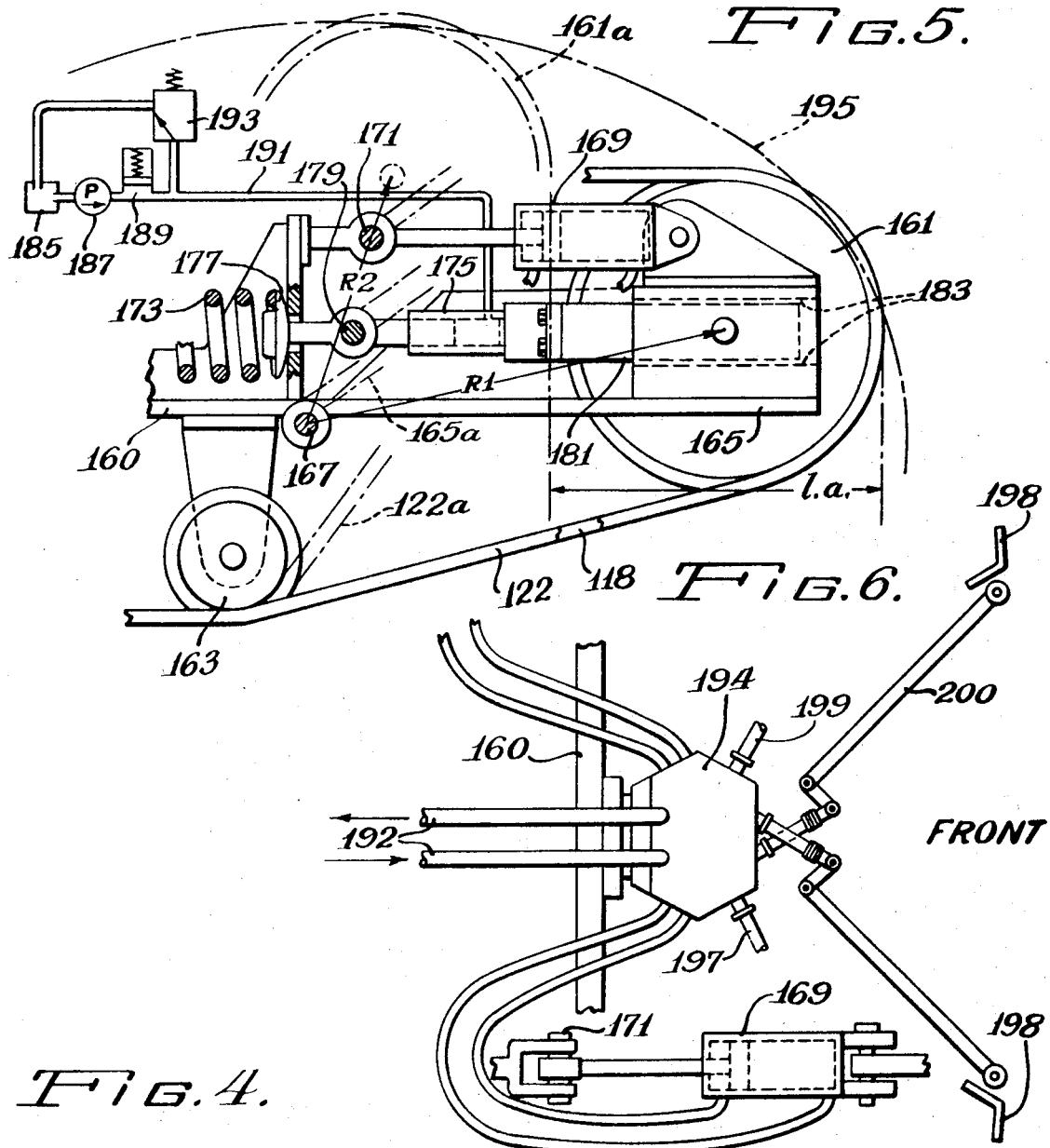

CLOSE COUPLED FRAME STEERED ALL CRAWLER TRACTOR

The invention involves certain improvements in structure over the structure disclosed in my U.S. Pat. No. 3,451,494, the two being related structures.

This invention relates to a close-coupled frame-steered crawler tractor. The tractor has articulately connected front and rear frame sections and qualifies as an all track or crawler type vehicle because each section carries endless crawler tracks disposed one at each side of the frame of the section. In regular way, the sections articulate on a vertical axis and roll on a longitudinal axis relative to one another.

Crawler vehicles are steered by driving according to the practice. The comparatively long flotation area or foot print supporting each crawler track, and the track width and its essentially 1.0 coefficient of friction with the ground, provide ample justification for the dominance of crawlers in many industrial and farm vehicle applications. Extra weight, added as ballast just to increase dead weight or to improve balance, is very often an unnecessary and undesirable requirement for crawlers, although required for rubber tire vehicles of cognate makes.

Accomplishing steering by driving with a single control lever or with a steering wheel has not proved practical. It is therefore the practice to tolerate both the complex multi-lever or multi-pedal steering system conventional in the designs, and the extensive lengths of both the vehicle and the flotation area of its tracks, which latter are, nevertheless, adaptable to turning, under that manual control which is above referred to as steering-by-driving. Not only is the so-called interface of the manual control, as presented to the operator, complex and expensive but also the various steering brakes and steering clutches or the like are complex and expensive, particularly expensive.

Objects of the present invention of a close-coupled crawler adaptation of a frame-steered vehicle are to materially reduce, if not substantially eliminate, the foregoing complications with crawlers, and to provide a lengthwise compact and maneuverable crawler vehicle which will readily steer under frame steering and in response to a conventional steering wheel, as will now be explained in detail.

Features, objects, and advantages will either be specifically pointed out or become apparent when for a better understanding of my invention, reference is made to the following description, taken in conjunction with the accompanying drawings which show certain preferred embodiments thereof and in which:

FIGS. 2 and 3 are in elevation and plan, as viewed respectively from the right side and from the top of the control cylinders present on the rear frame section and affording steering;

FIG. 4 is diagrammatically in plan, as viewed from the top of the front and rear frame sections during execution of a steered turn; and FIGS. 5, 6 and 7 are, similarly to FIGS. 2, 3 and 4 in elevation, plan, and plan respectively as viewed from the right side, top, and top of a modified embodiment of the invention.

Figure 1:
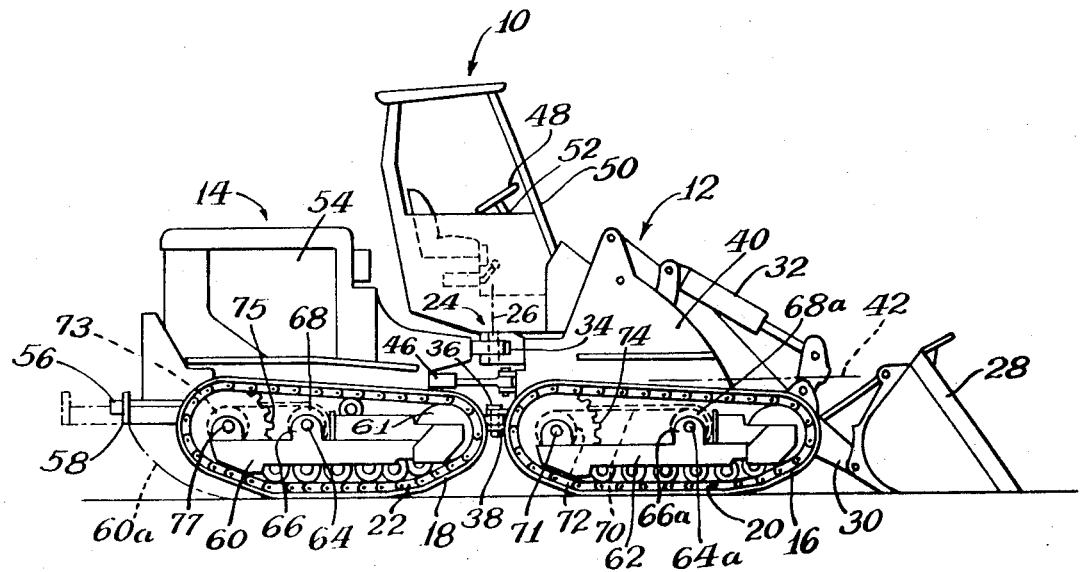
FIG. 1 is in elevation, as viewed from the right side of an all crawler articulated tractor embodying the invention.

More particularly in FIG. 1, an articulated crawler tractor vehicle 10 is shown having first and second frame sections 12 and 14 at the front and rear which carry corresponding left endless chain-type tracks 16 and 18 (FIG. 4) and corresponding right endless chain-type tracks 20 and 22. At their adjacent ends, the frame sections 12 and 14 have an articulated connection 24 of a type having a single upright axis 26 of articulation. The connection used is not to be limited to the type with a single axis as illustrated, such single axis defining and necessarily being coincident with the actual swing center of the connection shown.

The close-coupled configuration of the tractor 10 fore and aft adapts it especially for high maneuverability and for operations in particularly close quarters, as for work as a front end loader. For that work, the tractor 10 is equipped with a loader bucket 28 at the front end of the first section 12, the bucket 28 being interconnected therewith by the usual pairs of supporting linkage elements including pivoted boom arms 30, tilt cylinders 32, and lift cylinders not shown, below the boom arms. The tractor 10 can move the bucket 28 into a load or can hold or dump a load while in relatively tight confines, or while executing a sharp turn, or both.

The handling advantages are equally important with other buckets, blades, and tools, and the vehicle can readily be equipped with a rear end loader linkage, push dozer linkage, bullgrader linkage, or rear dozer linkage as appropriate to the work.

The articulated connection 24 comprises spaced apart upper and lower pin-type hinges 34 and 36 which are aligned on the generally upright axis 26 in the simplified illustration. The forward halves of the hinges 34 and 36 are shown rigid with the front running gear frame 38 under the front body 40 of the first frame section 12.

In actual practice, however, a thrust bearing arrangement including longitudinally disposed and aligned pivot pins will interconnect the front frame 38 and the hinges 34 and 36, enabling in regular way the first section 12 to twist on a central longitudinal axis 42. The first frame section 12 can thus relatively roll into and out of the vertical plane containing the upright axis 26 and second section 14 so as to maintain flotation and traction among the collective tracks 16, 18, 20, and 22 in their simultaneous contact with the ground.

Such a thrust bearing arrangement including longitudinally disposed pivot pins for supporting the running gear frame 38 fixed to the front body 40 is known in the art, for instance as disclosed in U.S. Pat. No. 3,159,229.

A pair of hydraulic steering cylinders 44 and 46, of which only the right cylinder 46 appears in FIG. 1, is disposed one at each side of the upright axis 26 and at a level intermediate the upper and lower pin-type hinges 34 and 36. The cylinder at each side of the tractor 10 interconnects the sections at that side and, as a result of foreshortening one cylinder and extending the other simultaneously under power, the two sections 12 and 14 angulate at the axis 26.

The two cylinders 44 and 46 and a valve connected steering wheel 48 on the front section in an operator's cab 50 form part of an hydraulic steering system generally indicated at 52. In conventional way, when the steering-valve-connected wheel 48 takes an angular displacement from neutral to any fixed number of degrees, the steering valve causes the cylinders 44 and 46 to angularly force the sections from straightaway to some angle in fixed ratio to the steering wheel displacement. If the steering wheel 48 is restored to neutral, the frames are straightened at the joint and restored to the straightaway position.

The pistons, not shown, are supported by steering piston rods internally of the cylinders 44 and 46 so as to bottom at a corresponding end or at both ends of the cylinders, providing stops to limit angulation between the sections to an ample value desired.

It is important to have the operator provided with a steering wheel for the short turning, compact, all crawler vehicle hereof, in lieu of prior steering systems for crawler vehicles employing one or more levers for controlling steering brakes, clutches, or other devices used heretofore. To provide less sway and more convenience to the operator, the forwardly facing cab 50 is at or adjacent the upright axis 26, at an epicentric point which can be seen to be as close to the axis as possible and yet at a point accessible for close observation of the front end mounted tool, such as bucket 28 illustrated.

The second frame section 14 has the engine 54 in the rear body, which body carries a sub-frame 56 that is longitudinally slidably related to the rear running gear frame 58. In this way, two opposite rear track frames 60 have an advanced position as shown in solid lines and a retracted position as shown by the broken lines 60a relative to the front track frames indicated at 62.

FRONT TRACK FRAMES 62 — FIG. 1

Two aligned, oppositely extending pivot shafts 64a support the front running gear frame 38 of the first section 12, and are supported at each side by an upstanding shaft support 66a on the front track frames 62. The supports 66a are journaled upon and freely rotate relative to the pivot shafts 64a.

A drive sprocket 68a is also journaled upon and freely rotates relative to each pivot shaft 64a. An endless chain 70 in each front track frame interconnects the drive sprocket 68a and a secondary sprocket 72. The sprocket 72 is fast to the inner end of the same axle 71 as a track sprocket 74 provided at the side of the section 12 for turning the endless track 16 or 20 at that side.

A suitable power path provided for transmitting drive from the tractor engine 54 to the drive sprockets 68a, including a differential connection as desired, is understood in the art and is not illustrated. The upstanding shaft support 66a on each front track frame is preferably in a mid-position on the frame so that the resultant of the ground reaction will be at a point passing upwardly reasonably close to the pivot shaft 64a for better balance. Each track frame pitches on the shaft in passing over terrain so that it always remains parallel with the ground on the level, on a slope, or on a grade.

REAR TRACK FRAMES 60 — FIGS. 1 AND 2

In the rear track frames 60 on the pivot shafts 64, on which the corresponding shaft supports 66 and drive sprockets 68 are journaled in the way described, are actually illustrated in a position somewhat to the rear of the ideal mid-position location on the track frames 60. In case the mid-position is the preferable one or a position somewhat forwardly thereof for the shaft supports 66, the second section 14 can by design be re-located farther forwardly in such case, further shortening or eliminating the overhanging length of the second section at the rear.

The subframe 56 of the rear body carries an upstanding reaction plate 74 and also carries depending rows of antifriction rollers 76 which run upon straight guide ways 78 carried by the rear running gear frame 58. The rollers 76 facilitate the relative longitudinal adjustment of the running gear frame 58. Each frame 60 has a first drive transmitting means consisting of a track driving axle 77 common to a secondary sprocket 73 and a track sprocket 75 both of which are fast to the axle.

A second drive transmitting means consists of a longitudinal endless chain 79 in the sub-frame 56 trained over sprockets, such as a fixedly journaled sprocket 80 therein, so as to connect the engine 54 to an engine connected sprocket 82. The sprocket 82, the drive sprockets 68, and an interconnecting drive transferring, hollow rotary shaft 84 are journalled concentrically to the pivot shafts 64 and transmit drive to the track connected drive sprockets 68 which by rotary drive transfer cause the rear tracks 18 and 22 to circulate on the track frames. The running gear frame 58 carries the pivot shafts 64 and also carries two idler sprockets 86 over which the sprocket chain 79 is trained to circulate.

Connected between the reaction plate 74 and the running gear frame 58, are two longitudinally disposed cylinders 88 and 90 of which only the right cylinder 88 is shown. Hydraulic extension and foreshortening of the cylinders cause relative longitudinal movement of retraction and advancement of the track frames 60 relative to the front track frames 62.

The two running gear frames can thus pivot relative to one another on a vertical axis in the middle, and roll and reciprocate relative to one another on a central longitudinal axis. Finally, the pitching of the track frames on their associated running gear frames insures substantially unbroken flotation area of the track on each side from front to rear of the present articulated tractor. Stated otherwise, the four track assemblies need not lift at all and can all sustain contact remaining flat against the ground.

Figure 2:
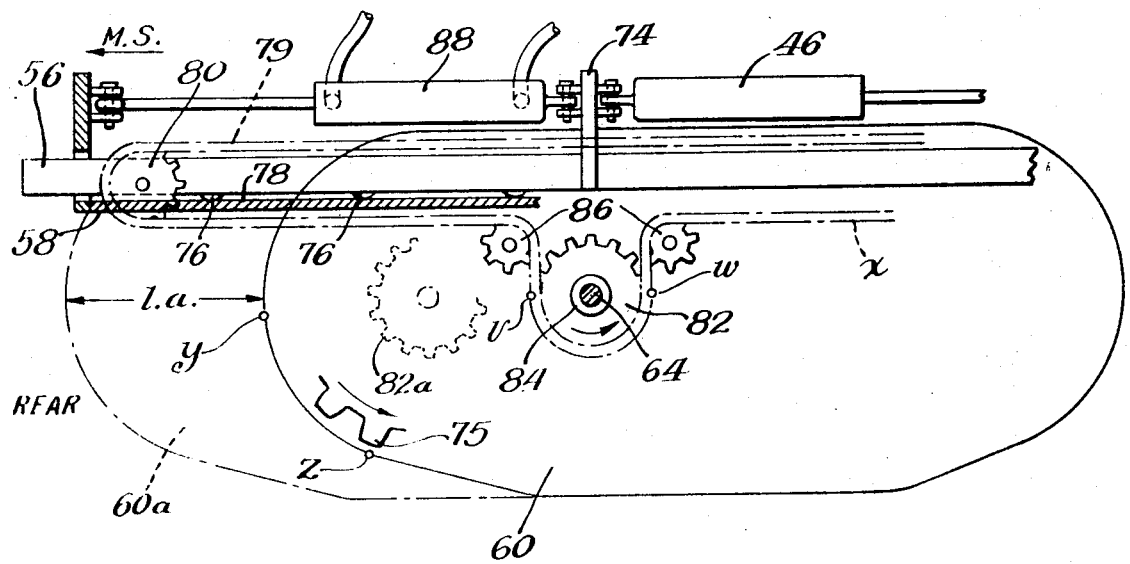

During the track retraction referred to, the driving axle 77 in each frame and sprockets 73 and 75 fast thereto have counterclockwise rotation in the direction of the arrow on track sprocket 75 (FIG. 2). Also the interconnecting hollow shaft 84 and sprockets 82, 68, 68 thereon have counterclockwise rotation in the direction of the arrow on the engine-connected sprocket 82.

So, with the longitudinally extending drive transmitting chain 79 stationary and with each track sprocket 75 thus rotating, a segment of track chain from y to z will be paid out forwardly relative to the sprocket 75 and fed toward the ground as the track frame 60 moves from the solid line position to the retracted position shown in broken lines 60a. Simultaneously, with the chain 79 fixed and with the thus rotating sprocket 82 retracting from the solid line position into the retracted position shown by the broken lines 82a, the bight or segment from v to w of chain wrapped under the sprocket 82 which transfers into the front lower flight x of the chain 79 will in developed amount be equal to the amount of retraction of the frame 60 namely, the linear amount indicated at 1.a. Overall, therefore, each track frame 60 is, at the time, retractively adjusting in linear amount 1.a. in direct proportion to the amount by which each axle 77 is forcing the circulating track to be laid or paid out forwardly off the bottom of the track sprocket 75.

The same sprocket pitch diameter is present in the engine-connected sprocket 82, in the interconnecting drive sprocket 68, and in the secondary sprocket 73 of the first drive transmitting means. Such common sprocket pitch diameter as shown is not as large as the pitch diameter of the track sprocket 75 of the first drive transmitting means. But if that common sprocket pitch diameter is made as large as the one for sprocket 75, the advantage attained is that the developed length of track being paid off the sprocket 75 and the developed length of chain paid off the sprocket 82 and the linear amount 1.a. of frame adjustment all become equal. The tracks 18 and 22 will therefore not tend to be dragged or to skid on the ground during movement of advancement or retraction of the track frames 60.

Providing a suitable power train, for transmitting drive from the tractor engine 54 to the second drive transmitting means consisting of the longitudinal chain 79, including differential gearing, is understood in the art. Such train intervenes between the front end of the chain 79 and the forward of the engine 54 but is not illustrated. In any case, the speed of the two drive sprockets 68a, FIG. 1, is kept the same. Also the speed of the two drive sprockets 68 is kept the same. Thus turns are executed with each track at one side of the tractor being driven at the same speed as its companion track on the opposite side. So the inboard ones of the tracks make slightly less distance good per revolution during a turn.

The dynamic conditions of drive produce a beneficial ratio change when the engine has the chain 79 circulating, for instance, clockwise as viewed in FIG. 2 whereby the running gear frames are sustained underway in the forward direction. The procedure affording the required ratio change occurs automatically in the steps following delivering rotary power as just described to the running gear frames at the same drive rate to sustain them on their way, such steps consisting of applying compressive and tensile power between the front and rear frames to change the spacing by movement of separation (MS) and approach, selectively, and changing the rotary power to a disproportionate delivery to the frames at both certain times when the compressive power is applied so that during their movement of separation the front one of the frames has the relatively fast drive rate, and at other times when the tensile power is applied so that during their movement of approach the rear one of the frames has the relatively fast drive rate. That is to say, movement of approach causes the rotary drive transmitting sprocket 82 to unwrap the lower bight of chain 79 at a faster rate to accelerate the rear track chains to a relatively faster drive rate temporarily, and vice versa.

Thus, although the chain 79 can stay running at fixed speed, the track will be circulating about the track frames at a varying rate as long as the track frames cause the sprocket 82 to be moved therewith to and fro along the lower flight of the chain 79 and the sprocket keeps adjusting the drive ratio.

Each of the frame sections 12 and 14 is entirely self-sustaining when disconnected at the articulation 24.

RETRACTION TO INCREASE STABILITY — FIG. 1

The force of load in a cantilevered front bucket 28 tending to rock the first frame section 12 forwardly about its pivot shafts 64a is countered by the force through the center of gravity of the weighty second frame section 14. The center of gravity of the latter can be shifted farther rearwardly with retraction of the track frames from the solid line position 60 to the broken line position 60a. The operator will therefore shift the frames for the increased stability during some phases of strenuous digging and loading with the bucket 28, such as digging head on when straightaway.

TURNING AFFORDED DURING RETRACTION — FIG. 3

Automatic mechanism can be provided so that the cylinders 88 and 90 automatically retract the running gear frame of the second frame section, preventing the rear tracks from climbing up on the front tracks when the operator sets the tractor in a turn.

Hydraulics are employed in the illustrated form of one such mechanism, which includes service lines 92 connected to the suction and discharge of an hydraulic pump and forming therewith a source of high and low fluid pressure. An overcontrolling valve 94 with six connections thereon operates to simultaneously extend and simultaneously foreshorten the cylinders 88 and 90 by selectively connecting similar ends of same to pressure while the opposite ends are connected to drain. When the valve 94 is in the neutral position illustrated, the cylinders 88 and 90 occupy their foreshortened position so that the rear track frames, not shown, have a corresponding position fully advanced with respect to the front track frames.

A manual push rod connection 96 enables the operator to control the valve 94 to retract the rear track frames in an emergency, or if desired during a turn, or if desired for greater stability when the frame sections are straightaway to one another.

Retraction of the rear track frames is automatic during a right turn, for example, because of a valve cam actuator 98. The cam 98 is carried by the left steering cylinder 44 and moves therewith as the cylinder swings inwardly to the right turn position as shown by the broken lines 44a. An actuatable bellcrank 100, which is carried by the valve and is engaged by the cam, is deflected against the action of a compression spring 102 so as to depress the valve push rod 104 and cause the cylinders 88 and 90 to extend themselves. At the time, the right steering cylinder 46 will occupy the broken line position 46a to which it swings in a direction away from the articulation 24.

Retraction of the rear track frames is caused in the same way during a left turn because the right steering cylinder 46 cams another valve push rod 106 into depressed position disturbing and operating the valve 94. When all three push rods 104, 106, and 96 are released, the cylinders 88 and 90 hydraulically pull the rear track frames into their positions of advancement relative to the front track frames. Cooperation among the four cylinders 44, 46, 88 and 90 thus depends upon the angle of the steering means. In case all four cylinders are double acting, then in that case only one of the cylinders 44, 46 and only one of the cylinders 88, 90 are necessary.

TURNING — FIG. 4

From the angulated position of the tracks represented by the broken line straight ahead position S.A., the tracks 16, 18, 20, and 22 are moved into a right turn position R.T. attendant with each of the frames 38 and 58 angulating for its part relative to the other frame. The double headed arrow in FIG. 4 indicates the two directions of clockwise forward turning and counterclockwise rearward turning. The left turn position, not illustrated, produces counterclockwise forward turning and clockwise rearward turning.

In articulating for the turn, the inner corners of the rear tracks 18 and 22 move on a large radius arc 108 relative to the articulation 24, whereas the corners of the front tracks 16 and 18 move on a lesser arc such as the small radius arc 110. So although the present steering system is seemingly in violation of the known design preference requiring minimal differences between each ground traction means and the articulation 24, the objective of short turning radius is not sacrificed. Because of the large angle of articulation possible with the present steering system, an exceedingly short turning radius can be employed as long as the large arc 108 keeps the rear tracks from causing interference with the outside corner of the rear of the front track at the inside of the turn.

The implement represented at 28 is a push dozer blade. It is not essential that the track frames be retracted to provide clearance for steering a close-coupled tractor. Indeed, idler structure can be provided for retracting only that local portion at the front end of a rear endless track which is on the inside of the turn.

IDLER RETRACTION TO AFFORD TURNING — FIG. 5

Illustrative of one such idler structure is a rear track frame 160 carrying a front idler 161 corresponding to a front idler wheel 61 on the preceding discussed rear track frame 60. A section-steered tractor so equipped, not shown, has its second frame section provided with two of the track frames 160. The frames 160 carry the respective right rear track 122 and left rear track 118, trained thereon to circulate about the idler 161 and other idlers, and about sprockets and rollers including a front track roller 163. A cantilevered front extension 165 of each track frame 160 is secured thereto by an athwart horizontal pivot 167 at the end of the beam for pivoting up and down in the longitudinal vertical plane of the track frame. The extension 165 is normally held dead-ahead and horizontal in each track frame by means of a connected cylinder 169 which is secured at the rear end thereof by a pivot 171 to the end of the beam. The cylinder is known as a lift cylinder, functioning as a raise-lower power cylinder.

Conventional track tension mechanism is employed, including a preloaded, strong track spring 173 providing heavy compressive force and a tandem connected hydraulic track adjuster 175 providing light compressive force. A rocking spring seat 177 for the preloaded spring 173 and a pivot 179 between the spring seat and the adjuster 175 afford an adjustable anchoring point for the mechanism 175 so that it can accommodate to misalignment and prevent binding. An interfitted fork slider 181 on which the idler 161 is journaled, and upper and lower slideways 183 disposed longitudinally in the frame extension 165 guide the idler 161 normally in a straight fore and aft path to hold the tracks as far forwardly as the tension allows. Hydraulic pressure is maintained in the adjuster 175 for chain tensioning purposes, being communicated constantly thereto in a path leading from a reservoir 185, through a pump 187 and an accumulator 189 connected in that order, and thence into an inlet-outlet line 191 connected to the adjuster 175.

Pressure in the inlet-outlet line 191 is maintained by a conventional relief valve 193 which opens at or above a predetermined pressure to bypass fluid back to the reservoir 185. If the pressure relief is not fast enough, the preloaded track spring 173 compresses temporarily to relieve excessive overloads on the track chain.

MECHANICAL SWINGING OPERATION — FIG. 5

Retractive movement of the track 122, for instance, so as to temporarily foreshorten same at the inside of a right turn, is accomplished by foreshortening the lift cylinder 169. The wheel mounting extension 165 and the idler 161 conjointly rise, and at the same time the unstretchable track slides the idler rearwardly on the extension 165. The effect is that the idler 161 moves in a constrained path about a shifting swing center, the instant centers of which define a locus causing the idler path to conform to an ellipse parallel to a reference ellipse indicated at 195. The axis of the swing center is always transverse to the extension and parallel to the axis of the idler.

The track 122 maintains constant tension in moving with the idler to its retracted broken line track position as shown by the broken lines 122a. Such retraction not only prevents interference because of the upward component of displacement of the front portion of the track 122, but also more importantly prevents interference because of the linear amount 1.a. of the fore and aft component by which the track is withdrawn from the front track at the inside of the turn.

HYDRAULIC OVERCONTROLLING OPERATION — FIG. 6

An overcontrol valve 194 in the automatic hydraulic system is supplied with high and low pressure from a source 192, but individually selectively controls the lift cylinders 169, of which only the right lift cylinder 169 effective during right turns is illustrated. The cylinder 169 is caused to foreshorten either from a manual push rod 199 or from actuation by a cam 198 carried by the left one of the steering cylinders. Because of such foreshortening, the right track 122, not shown, withdraws at its front end because of a lifted and retracted front idler, not shown. There is no necessity for the counterpart left lift cylinder to foreshorten. Hence an operating bellcrank 200 between the overcontrolling valve 194 and the steering cylinder cam 198 referred to causes operation of only the illustrated right lift cylinder 169.

Foreshortening of the left track caused either by a manual push rod 197 on the right side or a bellcrank and push rod on the right side of valve 194 can be appreciated if the unshown left lift cylinder 169 is visualized. The valve 194 is so adjusted that, in the neutral position when none of the plungers is depressed the valve causes both cylinders 169 to occupy their fully extended straight out position. A stop, not shown, prevents any downward movement below horizontal.

It is to be understood that the developed length of the endless track 122 and the endless track 118 remains essentially constant. Only the outline changes in order to withdraw the most forwardly extending portion of each track from the adjacent track on the first frame section.

From the front end of the beam on the track frame 160, the instant radius R2 (FIG. 5) to the wheel during retractive movement increases in vertical angle and decreases in length, and changes vice versa to R1 during movement of advance to the dead-ahead position.

RIGHT TURN — FIG. 7

In a right turn, the front tracks 116, 120 and a blade 128 on the first frame section move clockwise from their broken line positions as shown in top plan. The rear tracks 118 and 122 move counterclockwise from their broken line positions, the center of relative movement being the shifting center defined by the articulation 124 of the tractor. However, the inner corner of the left track 118 follows a small radius arc 210 which can equal or approximate the arc 210 followed by the inner corners of the front tracks 116 and 120.

The inner corner of the right rear track 122 follows a large radius arc 208 so as to stay outside of the adjacent front track 120 on the inside of the right turn.

The left turn is readily visualized, wherein the right track 122 which is on the outside rear of the turn remains advanced and the track 118 at the rear inside of the turn is retracted relative to the front track 116 which is on the inside.

TURNING RADIUS

An exceptionally short turning radius is possible with the arrangement of FIG. 7. The point indicated at P2 (to which a point in FIG. 4 corresponds) determines the center of the turn. It can be made as shown in FIGS. 4 and 7, to fall within the triangle defined by the angulated portions of the tractor at the inside of the turn. So the tractor in effect turns about the vertical axis passing through the fixed point P2, present in the actual confines of the tractor within the included angle of the angulation.

In terms of each first section starting from a straight ahead position referenced to the second section, the first section swing angle afforded in the disclosed arrangements can run to about 35° as the limit to either side, or 45° as the limit, up to 85° or slightly more as the practical limit for turns of exceptionally short radius. A vehicle which is section steered, as here, can in many cases make sharper turns than the vehicle which is wheel steered by the usual dirigible wheels, such as the front wheels of a dump truck, the rear wheels of a fork truck, and the front and rear wheels of some fire trucks.

As herein disclosed, the single track 122 at the rear inside of the turn is the one which foreshortens to accommodate steering. It is evident that the other inside track or both of the inside tracks 120 and 122 can be arranged to simultaneously foreshorten their adjacent portions.

It is equally evident that both tracks of either section can be simultaneously withdrawn in FIGS. 1 and 7, or three or all four of the tracks can simultaneously be withdrawn from one another in accommodation of steering to left or right.

If the desire arises to avoid skid steering wherein the tracks skid because the tracks on opposite sides of each section turn at the same speed at all times, a customary differential drive arrangement can be interposed. Thus in the case of the preferred embodiment of FIG. 2, the rotary interconnecting drive transmitting sprocket 82 can have a differential connection respectively to the drive sprocket 68 at one side of the rear section and to the drive sprocket 68 at the other side. The front drive sprockets 64a in that case can have a similarly interposed inter sprocket differential drive. Also, the resulting interposed differential drives can have a similarly interposed inter differential drive from the engine.

It is evident that, in comparison to longer all track vehicles, the present close coupled vehicle has shorter overall length and yet maintains comparable track area or foot print length on the ground and affords just as much flotation. Self-evidently in comparison to the conventional long all crawler tractor, the present tractor if appropriately designed to possess the same overall length will result in having comparably much increased track area or foot print length on the ground from end to end and will result in providing much increased flotation. That is to say, designing the present tractor with more overall length means designing it with longer track frames and tracks.

Variations within the spirit and scope of the invention described are equally comprehended by the foregoing description.

What is claimed is:

1. In a track frame:
    a cantilever mounting (165) for a track idler normally carried in a longitudinally protruding position therefrom;
    an endless track chain (122) disposed in a longitudinal vertical plane and trained at an end over the track idler;
    hydraulic chain tensioner means for yieldably retracting the idler on its mounting toward said frame, including relief valve means opening to relieve pressure at or above a predetermined hydraulic pressure; and
    a raise-lower power cylinder (169) for swinging the idler upwardly to insure a compound movement whereby the retracting idler rises in a generally retractive elliptical path keeping the chain tension constant.

2. A method of negotiating turns with vehicle body units laterally articulately steered about pivotal connecting means, and with frames having substantially laterally and longitudinally aligned endless crawler tracks individual to the frames, each track having one crawler track end disposed adjacent and in steering interfering relation to the adjacent longitudinally aligned crawler track end on the other unit, said method characterized by the steps of:
    forcibly longitudinally separating at least one adjacent crawler track end portion of at least one endless crawler track from the adjacent crawler track end; and
    steering the vehicle with articulation and without interference from the crawler tracks while so forcibly separated.

* * * * *